United States Patent
Kakarala et al.

(10) Patent No.: US 6,515,074 B2
(45) Date of Patent: *Feb. 4, 2003

(54) THERMOPLASTIC POLYMER ALLOY COMPOSITIONS AND PROCESS FOR MANUFACTURE THEREOF

(75) Inventors: Srimannarayana Kakarala, Bloomfield Hills, MI (US); Dean Madden Bayer, Anderson, IN (US); Suresh Deepchand Shah, Troy, MI (US); Jason Bruce Clock, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 4 days.

This patent is subject to a terminal disclaimer.

(21) Appl. No.: 09/767,034

(22) Filed: Jan. 22, 2001

(65) Prior Publication Data

US 2002/0137847 A1 Sep. 26, 2002

(51) Int. Cl.⁷ .......................... C08L 23/00; C08L 23/04
(52) U.S. Cl. .................. 525/191; 525/208; 525/221; 525/222; 525/240; 525/387
(58) Field of Search ................... 525/191, 221, 525/240, 208, 222, 387

(56) References Cited

U.S. PATENT DOCUMENTS

| | | |
|---|---|---|
| 4,275,912 A | 6/1981 | Bayer |
| 4,413,856 A | 11/1983 | McMahan et al. |
| 4,679,837 A | 7/1987 | Rodriguez et al. |
| 4,998,761 A | 3/1991 | Bayer et al. |
| 5,219,197 A | 6/1993 | Rich et al. |
| 5,290,078 A | 3/1994 | Bayer et al. |
| 5,385,375 A | 1/1995 | Morgan et al. |
| 5,721,315 A | 2/1998 | Evans et al. |
| 5,783,629 A | 7/1998 | Srinivasan et al. |
| 5,783,630 A | 7/1998 | Evans et al. |
| 5,883,188 A | 3/1999 | Hwang et al. |
| 5,942,576 A | 8/1999 | Evans et al. |
| 5,959,032 A | 9/1999 | Evans et al. |
| 5,965,667 A | 10/1999 | Evans et al. |
| 5,985,999 A | 11/1999 | Dominguez et al. |
| 6,107,404 A | 8/2000 | Ryntz |
| 6,120,714 A | 9/2000 | Allan et al. |
| 6,153,680 A * | 11/2000 | Shah et al. ............ 524/425 |

OTHER PUBLICATIONS

S. Shah and N. Kakarala, Delphi Automotive Systems, Society of Automotive Engineers, Inc. (2000), "All Olefinic Interiors–What Will It Take To Happen?".

N. Kakarala, J. Anim, S. Beasley, J. Clock, and B. Spuck, Delphi Automotive Systems, SAE 2000 World Congress, Detroit, Michigan, Mar. 6–9, 2000, "Environmentally Conscious Manufacturing of TPO Instrument Panel Skins".

http://www.autofieldguide.com/articles/039904.html Plastics: The Applications Evolve –Mar. 1999.

http://www.sae.org/automag/prodbriefs_Feb. 2000/19.htm Automotive Engineering International Online: Product Briefs, Feb. 2000, p. 19.

* cited by examiner

Primary Examiner—Nathan M. Nutter
(74) Attorney, Agent, or Firm—Kathryn A. Marra

(57) ABSTRACT

Flexible thermoplastic polymer alloy compositions and process for preparing same are disclosed. The composition comprises a blend of about 20 to about 40 weight percent (hereinafter "wt. %") polypropylene; about 20 to about 50 wt. % uncrosslinked ethylene copolymer; about 2 to about 15 wt. % functionalized polymers, which functionalized polymers typically include maleated polypropylene; and about 1 to about 10 wt. % amines, which amines typically include long chain amines. Processes for mixing the compositions are also included.

16 Claims, No Drawings

THERMOPLASTIC POLYMER ALLOY COMPOSITIONS AND PROCESS FOR MANUFACTURE THEREOF

TECHNICAL FIELD

The present disclosure relates to thermoplastic polymer alloy compositions and processes for manufacture thereof.

BACKGROUND

Thermoplastic polymer alloy compositions have been developed to replace polyvinyl chloride for the fabrication of many articles. In the automotive field, thermoplastic polymer alloy compositions have been used for the fabrication of articles such as interior sheathing, including instrument panel skins, door panels, air bag covers, roof liners, and seat covers.

The current fabrication process includes the steps of melt blending and pelletizing a thermoplastic polymer alloy composition. The formed pellets are then fed into an extruder to form sheets of the pellets. The processing steps continue with embossing the sheets, applying a primer on a bottom surface of the sheet, heat curing, applying a primer on a top surface of the sheet, heat curing again, applying a top coat (e.g., paint) and heat curing again. After this multiple step process, the resultant sheets can be used to form articles of manufacture such as interior vehicle sheathing. The primer in the bottom surface of the sheet is typically needed to allow adhesion to the understructure, such as urethane foam understructures.

As mentioned, the surfaces of thermoplastic polymer alloy composition sheets are generally treated prior to applying paint or adhering to understructures. Various methods have been used to attempt to increase the surface activation of thermoplastic polymer alloy composition having substantial amounts of polypropylene and/or rubber. For example, primers or adhesion promoters such as chlorinated polyolefins have been used to improve the adherence of thermoplastic polymer alloy compositions. However, the chlorination process is highly corrosive, typically requiring glass lined reactors. Further, the reaction generally required relatively high residence times, thereby resulting in higher manufacturing cost for chlorinated thermoplastic polymer alloy compositions. In addition, at least two additional process steps are required to apply the liquid primer and hot air oven drying on both sides of the thermoplastic polymer alloy composition sheet.

There is a need in the art for a thermoplastic polymer alloy composition having improved adhesive properties in order to minimize or obviate the need for a separate surface primer activation step.

SUMMARY

The drawbacks and disadvantages of the prior art are overcome by a thermoplastic polymer alloy composition and processes for preparing same, wherein the composition comprises a blend of about 20 to about 40 weight percent (hereinafter "wt. %") polypropylene; about 20 to about 50 wt. % uncrosslinked ethylene copolymer; about 2 to about 15 wt. % functionalized polymers, which functionalized polymers include maleated polypropylene; and about 1 to about 10 wt. % amines, which amines include long chain amines.

The processes generally comprise mixing the foregoing compositions. In one embodiment, the process comprises melt blending the foregoing compositions. In another embodiment, the process comprises in-line compounding for direct sheet extrusion of the foregoing composition.

DETAILED DESCRIPTION

Described herein are flexible thermoplastic polymer alloy compositions, processes for preparing the compositions, and articles of manufacture prepared from the compositions. Flexible thermoplastic polymer alloy compositions refer to those having flex modulus values less than about 100,000 pounds per square inch (psi), preferably about 10,000 psi to about 70,000 psi, more preferably about 20,000 psi to about 60,000 psi. In one embodiment, a thermoplastic polymer alloy composition is disclosed comprising a blend of about 20 to about 40 wt. % polypropylene; about 20 to about 50 wt. % uncrosslinked ethylene copolymer; about 2 to about 15 wt. % functionalized polymers, which functionalized polymers include maleated polypropylene; and about 1 to about 10 wt. % amines, which amines include long chain amines. Optionally, the thermoplastic polymer alloy composition further comprises up to about 30 wt. %, and more preferably about 20 to about 30 wt. % ionomeric copolymer of ethylene and alpha, beta-unsaturated $C_3$–$C_8$ carboxylic acid; up to about 3 wt. %, preferably about 1 to about 2 wt. % crosslinking agent; up to about 40 wt. %, and more preferably about 10 to about 20 wt. % crosslinked copolymers of ethylene and propylene; up to about 30 wt. %, and more preferably about 20 to about 30 wt. % linear low density polyethylene (LLDPE); up to about 4 wt. % stabilizers; and up to about 10 wt. %, preferably about 1 to about 5 wt. % color pigments. The wt. % values disclosed are based on the weight of the total composition unless otherwise noted.

The thermoplastic polymer alloy compositions comprise about 20 to about 40 wt. %, more preferably about 25 to about 35 wt. % polypropylene. Suitable polypropylene includes, but is not limited to, crystalline polypropylene, and is intended to include, in addition to the homopolymer, those polymers that also contain minor amounts, usually not greater than about 15 wt. % based on the total weight of the polypropylene, of higher alpha-olefins, e.g., those containing 3–8 carbon atoms, such as butene, octene, and the like, as well as combinations comprising at least one of the foregoing higher alpha-olefins. The polypropylene polymers have melt indices of about 1 to about 400 grams/10 minutes (g/10 min.) measured at 230° C., employing a 2.16 kilogram (kg) weight.

The thermoplastic polymer alloy compositions further comprise about 20 to about 50 wt. %, more preferably about 25 to about 35 wt. %, uncrosslinked ethylene copolymer. Suitable uncrosslinked ethylene copolymers include, but are not limited to, ethylene propylene rubber, ethylene butene rubber, ethylene octene rubber, and the like, as well as combinations comprising at least one of the foregoing uncrosslinked ethylene copolymers, including copolymers having glass transition temperatures of about –70° C. or less. Preferably, an ethylene propylene non-conjugated diene copolymer (EPDM) is used. The non-conjugated dienes can contain about 6 to about 22 carbon atoms and have at least one readily polymerizable double bond. The uncrosslinked ethylene propylene copolymer rubber contains about 60 to about 80 wt. %, usually about 65 to about 75 wt. %, ethylene, based on the total weight of the EPDM. The amount of non-conjugated diene is generally about 1 to about 7 wt. %, usually about 2 to about 5 wt. %, based on the total weight of the EPDM. EPDM copolymers that are especially preferred are ethylene propylene-1, 4-hexadiene, ethylene propylene dicyclopentadiene, ethylene propylene norbornene, ethylene propylene-methylene-2-norbornene, and ethylene propylene-1, 4-hexadiene/norbornadiene copolymers. These materials provide depth of draw and a soft touch feel to the compositions. EPDM copolymers are particularly preferred for providing grain retention (greater absolute depth and reproduction of embossed pattern after thermoforming).

The thermoplastic polymer alloy compositions further comprise up to about 15 wt. %, preferably about 2 to about 15 wt. %, more preferably about 5 to about 10 wt. %, functionalized polymers. Suitable functionalized polymers include, but are not limited to, polymers having functionalized side chains, e.g., carboxyl groups such as carboxylic acids, dicarboxylic acids such as maleic acid, oxalic acid, malonic acid, and fumaric acid, and the like, as well as combinations comprising at least one of the foregoing functionalized side chains. In one embodiment, the functionalized polymer comprises maleated polypropylene.

In addition to the functionalized polymer, the thermoplastic polymer alloy compositions further comprise up to about 10 wt. %, preferably about 1 to about 10 wt. %, more preferably about 2 to about 4 wt. %, amines. Suitable amines include, but are not limited to, primary, secondary and tertiary amines, and the like. Preferably, the amine is a long chain amine with a number-average molecular weight of about 1000 to about 6000, preferably about 1500 to about 3000, and more preferably about 1500 to about 2000. Suitable amines include, but are not limited to, polyether amine, octadecyl amine, octyl amine, hexadecyl amine, cocoamine, dimethyloctadecylamine, stearyl amine, and the like, as well as combinations and copolymers comprising at least one of the foregoing amines. In one embodiment, the long chain amine comprises polyether amine.

Optionally, the thermoplastic polymer alloy composition further comprises about 20 to about 30 wt. % ionomeric copolymer of ethylene and alpha, beta-unsaturated $C_3$–$C_8$ carboxylic acid; about 1 to about 3 wt. % crosslinking agent; about 10 to about 20 wt. % crosslinked copolymers of ethylene and propylene; about 20 to about 30 wt. % linear low density polyethylene (LLDPE); up to about 4 wt. % stabilizers; and/or up to about 2 wt. % color pigments. Further, various additives known in the art may be used as needed to impart various properties to the composition, such as heat stability, stability upon exposure to ultraviolet wavelength radiation, long term durability, and processability.

The ionomeric copolymer, which can be present in an amount up to about 30 wt. %, with about 20 to about 30 wt. % preferred, can comprise an ionomeric copolymer of ethylene and alpha, beta-unsaturated $C_3$–C8 carboxylic acid. Preferred ionomeric copolymers are the sodium salt of ethylene-methacrylic acid copolymers, or the zinc salt of ethylene-methacrylic acid copolymers, and the like. The ionomeric copolymers of ethylene and an alpha, beta-unsaturated $C_3$–$C_8$ carboxylic acid facilitate adhesion (due to the ionic bonds therein) and impart scuff resistance to the composition.

The crosslinking agents which, preferably crosslink at least the ionomeric copolymer of ethylene and alpha, beta-unsaturated $C_3$–$C_8$ carboxylic acid, can be present in an amount of up to about 3 wt. %, with about 1 to about 2 wt. % preferred. Possible crosslinking agents include: an epoxy functionalized ethylene copolymer, such as epoxy functionalized copolymer (such as EPON® 828, available from Shell Corporation), ethylene methyl acrylate glycidyl methacrylate terpolymer, and the like, as well as combinations comprising at least one of the foregoing epoxy functionalized copolymers; peroxide crosslinking agents such as dicumyl peroxide with a catalyst such as divinyl benzene (DVB), and the like, as well as combinations comprising at least one of the foregoing peroxide crosslinking agents; free radical chain scavengers (for control of polypropylene depolymerization), and the like, as well as combinations comprising at least one of the foregoing crosslinking agents. The epoxy functionalized ethylene copolymer effects a high degree of entanglement and provides excellent scuff resistance, grain definition, grain retention, and melt strength.

LLDPE may be included in an amount of up to about 30 wt. %, and is preferably employed in an amount of about 10 to about 30 wt. %. Suitable LLDPE compounds generally have melt indices (measured at 230° C. employing 2.16 kilogram (kg) weight) of about 0.5 to about 5.0, preferably about 0.5 to about 2.0, and more preferably about 0.5 to about 1.0. The LLDPE generally is included for improvement in depth of draw in thermoforming and low temperature ductility.

The thermoplastic polymer alloy compositions can also optionally comprise stabilizers such as heat stabilizers, light stabilizers, and the like, as well as combinations comprising at least one of the foregoing stabilizers. Heat stabilizers include phenolics, hydroxyl amines, phosphites, and the like, as well as combinations comprising at least one of the foregoing heat stabilizers. Light stabilizers include low molecular weight (having number-average molecular weights less than about 1000) hindered amines, high molecular weight (having number-average molecular weights greater than about 1000) hindered amines, and the like, as well as combinations comprising at least one of the foregoing light stabilizers. Suitable stabilizers are known in the art, and the amount of stabilizer is readily empirically determined by the reaction employed and desired characteristics of the finished article, with up to about 4 wt. % stabilizer possible, and about 1–4 wt. % preferred.

In addition to the above optional components, the thermoplastic polymer alloy compositions can also optionally comprise a color pigment, dye, or the like, as well as combinations comprising at least one color additive. Suitable color pigments are known in the art, and the amount of color additive is readily empirically determined based on the desired color characteristics of the finished article, with up to about 10 wt. % color additive possible, and about 1–5 wt. % preferred.

The thermoplastic polymer alloy compositions may be accomplished by various techniques including melt blending, preferably under high shear conditions; in-line compounding; extruding; in-line thermoforming; calendering; and the like, as well as combinations comprising at least one of the foregoing techniques. Processes such as in-line compounding, extruding, and in-line thermoforming eliminate the need for a separate surface activation step. Furthermore, the processing of the materials in a single manufacturing step, i.e., concurrent irnline compounding and reactive extruding, forms the final sheet and eliminates the step of pellet processing, thus reducing the need for heat stabilizers and other additives. Significant cost savings are realized by in-line compounding of the composition and thermoforming articles therefrom.

The production techniques can be accomplished by employing conventional equipment such as extruders, mixers, kneaders, and the like. Suitable extruders include twin screw or single screw extruders. A particularly wellsuited extruder has a L/D (length of screw/barrel diameter) ratio of greater than 28:1 and further includes dispersive and distributive mixing capability. The components may be introduced into the extruder through a single feed or through multiple feeds. In an alternate embodiment, recycled materials (e.g., formed from scraps of a precompounded composition) may be extruded through an extruder. In either embodiment, extrudate is passed from the extruder through a process suitable for forming sheets. For example, the extrudates may be processed through a layer die followed by embossing rollers. The extruded sheets are typically transferred to rolls for forming articles of manufacture therefrom.

Optionally, a sheet may comprise separate layers, which include thermoplastic polymer alloy compositions that may be formed or extruded separately, and subsequently layered in a sheet die. A first layer and a second layer, for example, may comprise the same or different thermoplastic polymer alloy compositions. In one embodiment, the first layer comprises virgin material, and the second layer comprises a combination of virgin material and recycled material (e.g., including previously compounded first and second layers).

The following examples illustrate specific thermoplastic polymer alloy compositions suitable for use with the above and other processes. Table 1 provides a list of components used in the present examples, along with tradenames and sources for the components. It should be understood that the examples are given for the purpose of illustration and are not intended as limitations.

TABLE 1

| Component | Source | Tradename |
|---|---|---|
| Polypropylene | Amoco ®, Montell ®, Exxon ® | E.g., Accpro ®, available from Amoco ® |
| Ethylene based non cross-linked elastomer (e.g. EPR, EOR, EBR) | Dupont-DOW Elastomers ® Exxon ® | Engage ® Nordel ® Exact ® Vistalon ® |
| Maleated polypropylene | Eastman Chemical ® Uniroyal Chemical ® Allied Signal ® | Epolene ® Polybond ® ACX ® |
| Long chain amine | Huntsman Chemical ® | Jeffamine ® |
| Ionomer (Na or Zn based) | DuPont ® | Surlyn ® |
| Epoxy functionalized ethylene co-polymer (cross-linking agent for ionomer) | Dupont ® Shell ® | ElvaloyAS ® Epon ® 828 |
| Peroxide crosslinking (e.g. Dicumyl peroxide) | Commercially available from many sources such as Elf-Etochem ® and Akzo Nobel Chemicals ® | Commodity material |
| Cross-linked co-polymer of ethylene and propylene | Advanced Elastomer Systems ® | Santoprene ® |
| LLDPE (Linear Low Density Polyethylene) | Equistar ® | Petrothene ® |
| Heat and UV stabilizers and color pigments | Commercially available from many sources such as Ciba Specialty Chemicals ® Americhem ® | Tinuine ® (UV stabilizer) Chemisorb ® (heat and UV stabilizer) Color & Pigments |

Compositions were prepared having proportions as set forth in Table 2, and processed into extruded sheets.

TABLE 2

| | Sample # (parts per weight unit of total compound) | | | | |
|---|---|---|---|---|---|
| Component | 1 (control-surface activation) | 2 | 3 | 4 | 5 |
| Polypropylene | 25.0 | 25.0 | 20.0 | 25.0 | 25.0 |
| Ethylene Propylene rubber | 25.0 | 25.0 | 20.0 | 45.0 | 35.0 |
| Ionomer | 30.0 | 30.0 | 30.0 | 0.0 | 0.0 |
| Epoxy functionalized ethylene co-polymer | 2.0 | 2.0 | 2.0 | 0.0 | 0.0 |
| Maleated polypropylene | 0.0 | 7.0 | 7.0 | 7.0 | 7.0 |
| Long chain amine | 0.0 | 3.0 | 3.0 | 3.0 | 3.0 |
| Phenolic Stabilizer | 0.2 | 0.2 | 0.2 | 0.2 | 0.2 |
| Dicumyl Peroxide | 0.0 | 0.0 | 0.0 | 1.0 | 0.0 |
| Cross-linked copolymer of ethylene and propylene | 20.0 | 20.0 | 20.0 | 0.0 | 25.0 |
| LLDPE (Linear Low Density Polyethylene) | 0.0 | 0.0 | 10.0 | 20.0 | 15.0 |
| Color Concentrate | 4.0 | 4.0 | 4.0 | 4.0 | 4.0 |

TABLE 3

| | Properties | | | | |
|---|---|---|---|---|---|
| Sample # | 1 (control) | 2 | 3 | 4 | 5 |
| Foam Adhesion (without primer) | No Adhesion | Good Adhesion with foam on sheet | Good Adhesion with foam on sheet | Good Adhesion with foam on sheet | Good Adhesion with foam on sheet |
| Foam Adhesion (with primer) | Good Adhesion with foam on sheet | Primer not needed | Primer not needed | Primer not needed | Primer not needed |
| Topcoat Adhesion (without primer) | 0% adhesion | 95 to 100% | 95 to 100% | 95 to 100% | 95 to 100% |
| Topcoat Adhesion (with primer) | 95 to 100% | No primer | No primer | No primer | No primer |

Referring in part to Table 3, the compositions of samples 2–5, in comparison to the control sample, provided improved adhesion without an additional surface activation step. The various thermoplastic polymer alloy compositions resulted in desirable properties for vehicle interior skins, which properties include paint adhesion on top surface and urethane foam adhesion on bottom surface.

Sample 1, the control, was prepared according to existing techniques with and without primer (i.e., separate surface activation). Samples 2–5 were in-line compounded and coextruded to form sample sheets according to the present process.

Paint adhesion testing involved spray painting 10 inch by 10 inch sheets with water-based one-component urethane coating supplied by Dexter Corporation. The painted sheets were baked for 30 minutes at 210° F. The test specimens were conditioned for 24 hours and then tested using a cross hatch/tape adhesion test where a multibladed scribe was used to generate 100 squares (approximately 2 millimeter ("mm") by 2 mm) on the sheets. A piece of tape (Scotch® Brand 2040, 3M®) was then applied over the squares and then the tape was pulled from the sheet. The percentages denoted in the table reflect the number of painted squares remaining after pulling the tape from the sheet.

Foam adhesion testing required preparation of urethane foam laminated sheets. 12 inch by 12 inch sheet samples were cut from the primed and unprimed sheet rolls for the control, and from the extruded unprimed rolls for the test samples 2 through 5. The test sheet samples were placed in a plaque tool, and a two-component (polyol and isocyanate provided by BASF® Corporation) urethane foam liquid at 100 index (referring to ratio of approximately 1:1 hydroxyl groups to isocyanate groups components) was used to fill the tool to obtain about 7 pounds per square foot foam density. The test specimens were conditioned for 24 hours and then tested for 180 degree peel adhesion. The foam adhesion was considered good when foam tore with some of the foam remaining on the sheet surface. If foam separated from the sheet surface with no tearing, then the test result was indicated as no foam adhesion.

Foam adhesion for sheets prepared with the compositions of sample 1 gave good foam adhesion when adhesion primer was applied on the sheet prior to urethane foaming. However, when no primer was applied to sample 1, the 80 degree peel test resulted in no foam adhesion. The formulations in Examples 2–5 had good foam adhesion without using the adhesion primer.

Topcoat adhesion without primer for sheets prepared with the compositions of Example 1 was evaluated using the conventional cross hatch tape adhesion test. The paint film completely removed with the tape showing 0 adhesion. As expected, the primed specimens of sample 1 formulation gave excellent paint adhesion on the cross hatch tape adhesion test.

Topcoat adhesion without primer for sheets prepared with the compositions of samples 2–5 were evaluated using the conventional paint adhesion test. It can be seen that the compositions of samples 2–5, provided the same or better foam adhesion, topcoat adhesion without primer, when compared with the control using adhesion primer. Further, the present process eliminates the separate processing step (s) required for surface activation of thermoplastic polymer alloy composition sheets.

The thermoplastic polymer alloy compositions, process, and articles made therefrom, although primarily described in relation to vehicle applications such as interior sheathing, including instrument panel skins, door panels, air bag covers, roof liners, and seat covers, can be utilized in numerous applications, including, but not limited to, other transportation interiors such as those found in locomotives, airplanes, and watercrafts; home furnishings; and luggage, among others.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. A composition for forming a flexible thermoplastic polymer alloy comprising, based on the total weight of the alloy:

about 20 to about 40 wt. % polypropylene or copolymer thereof;

about 20 to about 50 wt. % uncrosslinked ethylene copolymer;

about 2 to about 15 wt. % functionalized polymers; and about 1 to about 10 wt. % amines.

2. The composition of claim 1, further comprising up to about 30 wt. % ionomeric copolymer of ethylene and alpha, beta-unsaturated $C_3$–$C_8$ carboxylic acid.

3. The composition of claim 2, further comprising up to about 3 wt. % crosslinking agent.

4. The composition of claim 3, further comprising up to about 40 wt. % crosslinked copolymers of ethylene and propylene.

5. The composition of claim 1, further comprising up to about 40 wt. % crosslinked copolymers of ethylene and propylene.

6. The composition of claim 5, further comprising up to about 30 wt. % linear low density polyethylene.

7. The composition of claim 1, further comprising up to about 30 wt. % linear low density polyethylene.

8. The composition of claim 1, further comprising up to about 4 wt. % stabilizers.

9. The composition of claim 1, further comprising up to about 2 wt. % color pigments.

10. The composition of claim 1, wherein said functionalized polymers comprise maleated polypropylene.

11. The composition of claim 1, comprising at least about 2 wt. % functionalized polymers.

12. The composition of claim 1, wherein the amines comprise long chain amines.

13. The composition of claim 1, comprising at least about 1 wt. % amines.

14. The composition of claim 1 having a flex modulus less than about 100,000 psi.

15. The composition of claim 1 having a flex modulus of about 10,000 psi to about 70,000 psi.

16. The composition of claim 1 having a flex modulus of about 20,000 psi to about 60,000 psi.

* * * * *